United States Patent
Oonishi (10) Patent No.: US 12,461,506 B2
(45) Date of Patent: Nov. 4, 2025

(54) CONTROL DEVICE AND CONTROL SYSTEM FOR MACHINE TOOL PERFORMING POLYGON TURNING

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 454 days.

(21) Appl. No.: 17/998,493

(22) PCT Filed: May 12, 2021

(86) PCT No.: PCT/JP2021/017994
§ 371 (c)(1),
(2) Date: Nov. 11, 2022

(87) PCT Pub. No.: WO2021/230273
PCT Pub. Date: Nov. 18, 2021

(65) Prior Publication Data
US 2023/0213916 A1 Jul. 6, 2023

(30) Foreign Application Priority Data
May 14, 2020 (JP) .................. 2020-085293

(51) Int. Cl.
*G05B 19/416* (2006.01)
*G05B 19/418* (2006.01)
(52) U.S. Cl.
CPC ..... *G05B 19/416* (2013.01); *G05B 19/41825* (2013.01)
(58) Field of Classification Search
CPC .......... G05B 19/416; G05B 19/41825
(Continued)

(56) References Cited

U.S. PATENT DOCUMENTS 4,651,599 A * 3/1987 Ley ............ B23Q 27/00
451/211
5,224,404 A 7/1993 Kono et al.
(Continued)

FOREIGN PATENT DOCUMENTS

BR PI0501899 A 1/2007
CN 204374676 U 6/2015
(Continued)

OTHER PUBLICATIONS

Zhang, Xiaodong, et al. "Machining of optical freeform prisms by rotating tools turning." CIRP annals 61.1 (2012): 519-522, By: Zhang (Year: 2012).*
(Continued)

*Primary Examiner* — Jigneshkumar C Patel
(74) *Attorney, Agent, or Firm* — HAUPTMAN HAM, LLP (57) ABSTRACT

A control device that controls polygon turning to simultaneously rotate a workpiece and a tool and form a polygon on a surface of the workpiece inputs information on misalignment in a rotation direction of a cutting tool T attached to a tool body, generates adjustment pulses to correct the misalignment in the rotation direction of the cutting tool T, and generates a rotation command for rotating, at a predetermined angular velocity, a tool axis used for performing polygon turning. The control device then superimposes the generated adjustment pulses on the generated rotation command in idle running of the tool, corrects the misalignment in the rotation direction of the cutting tool T, and thereby improves the precision of the polygon turning.

4 Claims, 11 Drawing Sheets

(58) Field of Classification Search
USPC .......................................................... 700/188
See application file for complete search history.

(56) References Cited

U.S. PATENT DOCUMENTS

| | | | |
|---|---|---|---|
| 5,282,144 A | | 1/1994 | Kawamura et al. |
| 6,761,096 B1* | | 7/2004 | Kochsiek ............... B23Q 27/00 |
| | | | 82/1.11 |
| 2016/0039009 A1* | | 2/2016 | Matsumaru .......... B23Q 27/006 |
| | | | 82/1.11 |
| 2016/0045959 A1 | | 2/2016 | Matsumaru |
| 2022/0266364 A1* | | 8/2022 | Hoss ....................... B23F 5/163 |

FOREIGN PATENT DOCUMENTS

| | | | |
|---|---|---|---|
| JP | H04-033013 A | 2/1992 |
| JP | 2014-087853 A | 5/2014 |
| JP | 2014-168837 A | 9/2014 |
| JP | 2014188665 A | 10/2014 |
| JP | 2015-079348 A | 4/2015 |
| JP | 2015-139858 A | 8/2015 |
| JP | 2018140482 A | 9/2018 |
| WO | 2005091093 A1 | 9/2005 |

OTHER PUBLICATIONS

International Search Report in PCT/JP2021/017994, mailed Aug. 3, 2021. 2pp.

* cited by examiner

- - - - - - IDEAL POLYGON TURNING
- · - · - ONE CUTTING TOOL MISALIGNED IN PHASE

FIG. 6B

- - - - - - IDEAL POLYGON TURNING
- · - · - ONE CUTTING TOOL MISALIGNED IN PHASE
———— POLYGON TURNING OF PRESENT DISCLOSURE

QUADRANGLE

Prior Art

FIG. 11B

HEXAGON

Prior Art

CONTROL DEVICE AND CONTROL SYSTEM FOR MACHINE TOOL PERFORMING POLYGON TURNING

RELATED APPLICATIONS

The present application is a National Phase of International Application No. PCT/JP2021/017994 filed May 12, 2021, which claims priority to Japanese Application No. 2020-085293, filed May 14, 2020.

TECHNICAL FIELD

The present invention relates to a control device and a control system for a machine tool that performs polygon turning.

BACKGROUND ART

Conventionally, there has been polygon turning to process a workpiece into a shape of a polygon by rotating a tool and the workpiece at a constant ratio. In polygon turning, each tool edge draws an elliptical orbit about a workpiece. When the rotation ratio of a workpiece and a tool and the number of tools are changed, the phase or the number of ellipses changes, and accordingly, the workpiece can be processed into a polygon such as a quadrangle or a hexagon.

Figure 11A:
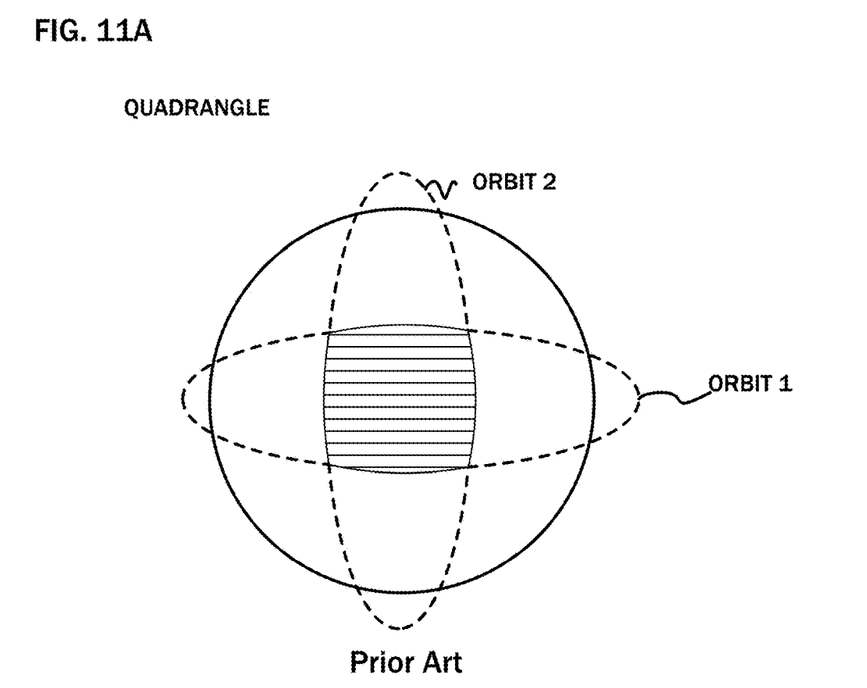
FIG. 11A is a diagram illustrating the conventional polygon turning.
Figure 11B:
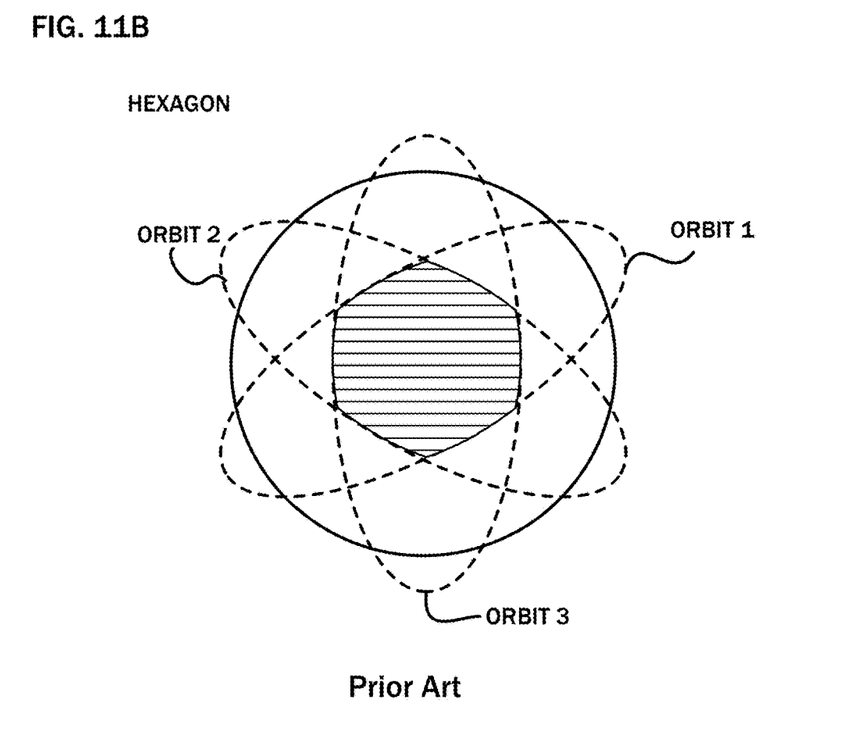
FIG. 11B is a diagram illustrating the conventional polygon turning.

FIG. 11A illustrates a motion path of a tool edge relative to a workpiece when the workpiece center is defined as the origin. In this example, the rotation ratio of the workpiece and the tool is 1:2, and the number of tools is two. The motion path of a tool T1 relative to the workpiece is orbit 1, and the motion path of a tool T2 relative to the workpiece is orbit 2. For one turn of the workpiece, the two tools T1 and T2 draw the elliptical orbits around the workpiece, and a quadrangle is formed on the workpiece surface. FIG. 11B illustrates motion paths of the tools T when the rotation ratio is 1:2 and the number of tools is three. In this case, when the three tools draw elliptical orbits around a workpiece and cut the workpiece surface along these orbits, a hexagon is formed.

Tools for performing polygon turning are called polygon cutters and are each formed of a tool body and cutting tools attached to the tool body. Patent Literature 1 discloses that a polygon turning tool is formed of an annular cutter body, three cutting inserts, three fixing bolts provided to fix these three inserts, respectively, and positioning bolts for aligning tool edges of the inserts.

In the processing tool (corresponding to a polygon cutter) of Patent Literature 1 described above, when arranged and fixed to a vacancy of the cutter body, each insert (corresponding to a cutting tool) is attached such that one of the cutting edges projects out of the outer circumferential face of the tool body. Once the cutting edge is fixed by the fixing bolts, rotation of the insert in the vacancy is stopped by the clamping force of the fixing bolts.

The processing tool of Patent Literature 1 is configured such that the inserts are mounted on the cutter body, and thereby the precision of polygon turning is increased with a larger tool diameter without requiring an increase in the size of the tool mechanism. Further, the positioning bolts and the fixing bolts are provided to enhance the cutting tool aligning function.

CITATION LIST

Patent Literature

Patent Literature 1: Japanese Patent Application Laid-Open No. 2018-140482

SUMMARY OF INVENTION

Technical Problem

Although the positioning bolts and the fixing bolts are provided to increase the cutting tool positioning precision in the processing tool of Patent Literature 1, the cutting tools are manually attached, and this may cause slight misalignment of the attachment position. Further, in polygon turning, respective cutting tools repeat cutting and idle running while rotating, and a load occurring when the cutting tool and the tool come into contact with each other may cause misalignment of the attachment position or a deformation of the tool. Such misalignment of the attachment position or a deformation of the tool affects the precision of the processed shape.

Further, as illustrated in FIG. 11A and FIG. 11B, since polygon turning is to form a polygon by using a combination of ellipses, a resulted cut surface has a shallow curve. Thus, polygon turning is unsuitable for such high-precision processing that requires high flatness. Polygon turning takes a shorter processing time than such processing that uses a milling machine or the like to form a polygon. Thus, polygon turning has been used for processing of a member that does not require high precision in practical use (such as a head of a bolt or a bit of a driver).

With improved precision of polygon turning, however, high-precision processing can be made in a short processing time.

In the field of polygon turning, there is a demand for a technique to improve precision.

Solution to Problem

One disclosure of the present invention is a control device that controls polygon turning to simultaneously rotate a workpiece and a tool and form a polygon on a surface of the workpiece, and the control device includes: a workpiece axis command generation unit that generates a command for an angular velocity of the workpiece; a tool axis command generation unit that generates a command for an angular velocity of the tool; a deviation acquisition unit that acquires information on misalignment in a rotation direction of a cutting tool attached to the tool; an adjustment amount generation unit that, based on the information on the misalignment in the rotation direction of the cutting tool acquired by the deviation acquisition unit, generates a pulse to adjust any one or both of a phase of a tool axis and a phase of a workpiece axis; and an adjustment amount superimposition unit that superimposes the pulse on any one or both of the command for the angular velocity of the workpiece and the command for the angular velocity of the tool.

Another aspect of the present invention is a control system that controls polygon turning to simultaneously rotate a workpiece and a tool and form a polygon on a surface of the workpiece, and the control system including: a workpiece axis command generation unit that generates a command for an angular velocity of the workpiece; a tool axis command generation unit that generates a command for an angular velocity of the tool; a deviation acquisition unit that acquires information on misalignment in a rotation direction of a cutting tool attached to the tool; an adjustment amount generation unit that, based on the information on the misalignment in the rotation direction of the cutting tool acquired by the deviation acquisition unit, generates a pulse to adjust any one or both of a phase of a tool axis and a phase of a workpiece axis; and an adjustment amount superimposition unit that superimposes the pulse on any one or both of the command for the angular velocity of the workpiece and the command for the angular velocity of the tool.

Advantageous Effects of Invention

According to the present disclosure, the precision of polygon turning can be improved.

DESCRIPTION OF EMBODIMENTS

Figure 1:
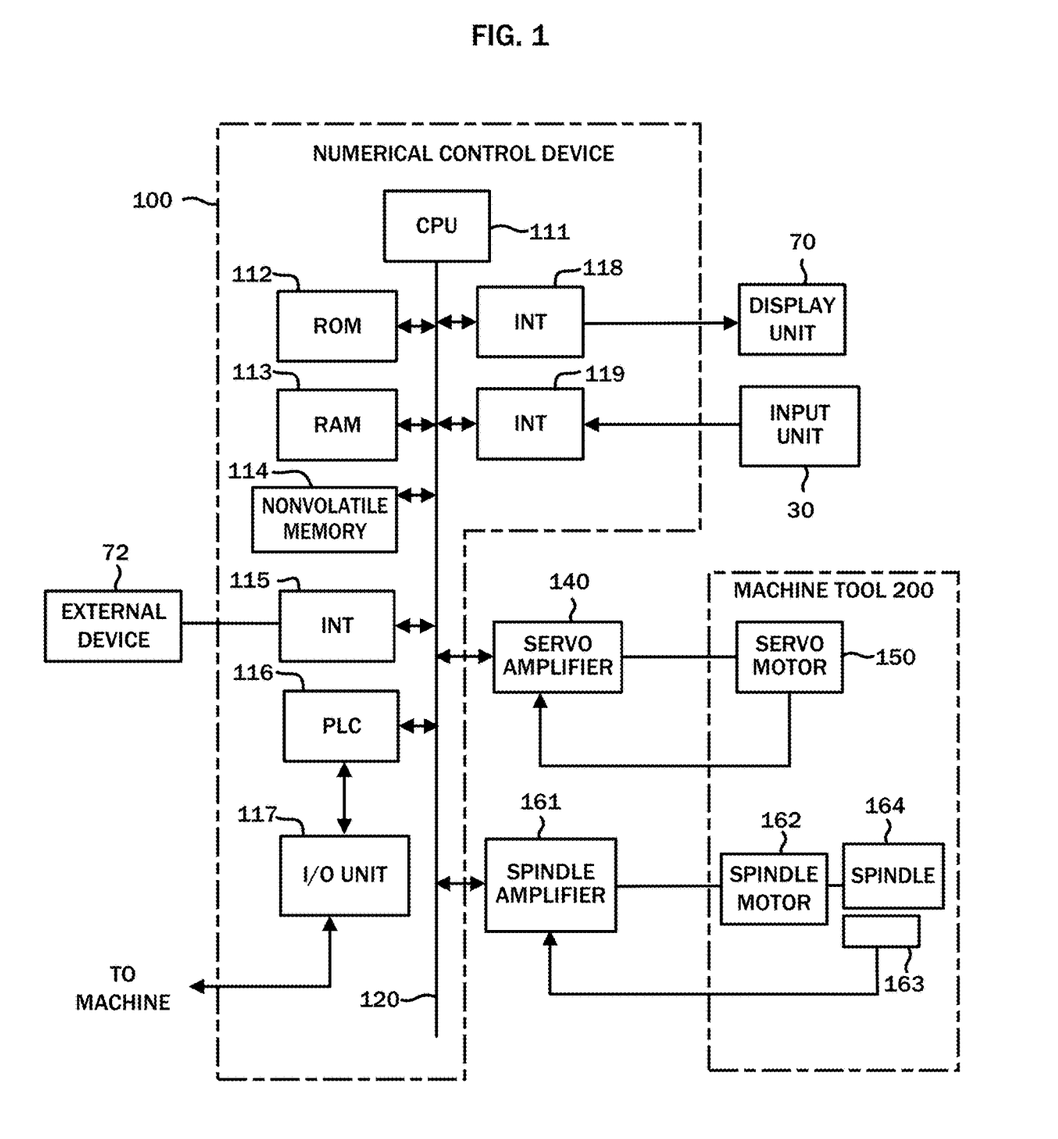
FIG. 1 is a hardware configuration diagram of a numerical control device in the present disclosure.

One example of a numerical control device 100 having an adjustment function for polygon turning will be illustrated below. As illustrated in FIG. 1, the numerical control device 100 includes a CPU 111 that controls the overall numerical control device 100, a ROM 112 that stores a program or data, and a RAM 113 into which data is temporarily loaded, and the CPU 111 reads a system program stored in the ROM 112 via a bus 120 and controls the overall numerical control device 100 in accordance with the system program.

A nonvolatile memory 114 is backed up or the like by a battery (not illustrated), for example, and the storage state is maintained even when the numerical control device 100 is powered off. The nonvolatile memory 114 stores a program loaded from an external device 72 via an interface 115, 118, or 119 or various data acquired from a user operation input via an input unit 30 or acquired from each unit of the numerical control device 100, a machine tool 200, or the like (for example, a setting parameter, sensor information, or the like).

The interface 115 is an interface for connecting the numerical control device 100 and the external device 72 such as an adaptor to each other. A program, various parameters, or the like are loaded from the external device 72 side. Further, a program, various parameters, or the like modified in the numerical control device 100 can be stored in an external storage unit via the external device 72. A programmable logic control (PLC) 116 performs input and output of a signal with the machine tool 200, a robot, and a device such as a sensor attached to the machine tool 200 or the robot via an I/O unit 117 and thereby controls the same by using a sequence program built in the numerical control device 100.

On a display unit 70, an operation screen of the machine tool 200, a display screen indicating the operation status of the machine tool 200, or the like are displayed. The input unit 30 is formed of an MDI, an operation panel, a touch panel, or the like and passes operation input made by a worker to the CPU 111.

A servo amplifier 140 controls respective axises of the machine tool 200. The servo amplifier 140 receives a command about the amount of axis motion from the CPU 111 and drives a servo motor 150. The servo motor 150 has a built-in position/speed detector and feeds a position/speed feedback signal from the position/speed detector back to the servo amplifier 140 to perform feedback control of the position/speed. A tool axis is attached to the servo motor 150. A plurality of cutting tools T used for performing polygon turning are attached to the tool body.

A spindle amplifier 161 receives a spindle rotation command for a spindle 164 of the machine tool 200 and drives a spindle motor 162. The power of the spindle motor 162 is transmitted to the spindle 164 via a gear, and the spindle 164 rotates at an instructed rotational rate. A position coder 163 is coupled to the spindle 164, the position coder 163 outputs feedback pulses in synchronization with the rotation of the spindle 164, and the feedback pulses are read by the CPU 111.

The workpiece W is attached to the spindle 164. The axis directions of the spindle 164 and the tool axis are parallel, and the spindle 164 and the tool axis rotate at a predetermined rotation ratio. When the spindle 164 and the tool axis rotate simultaneously, a tool U attached to the tool axis cuts the workpiece surface, and a polygon is formed on the workpiece surface.

[First Disclosure]

Figure 2:
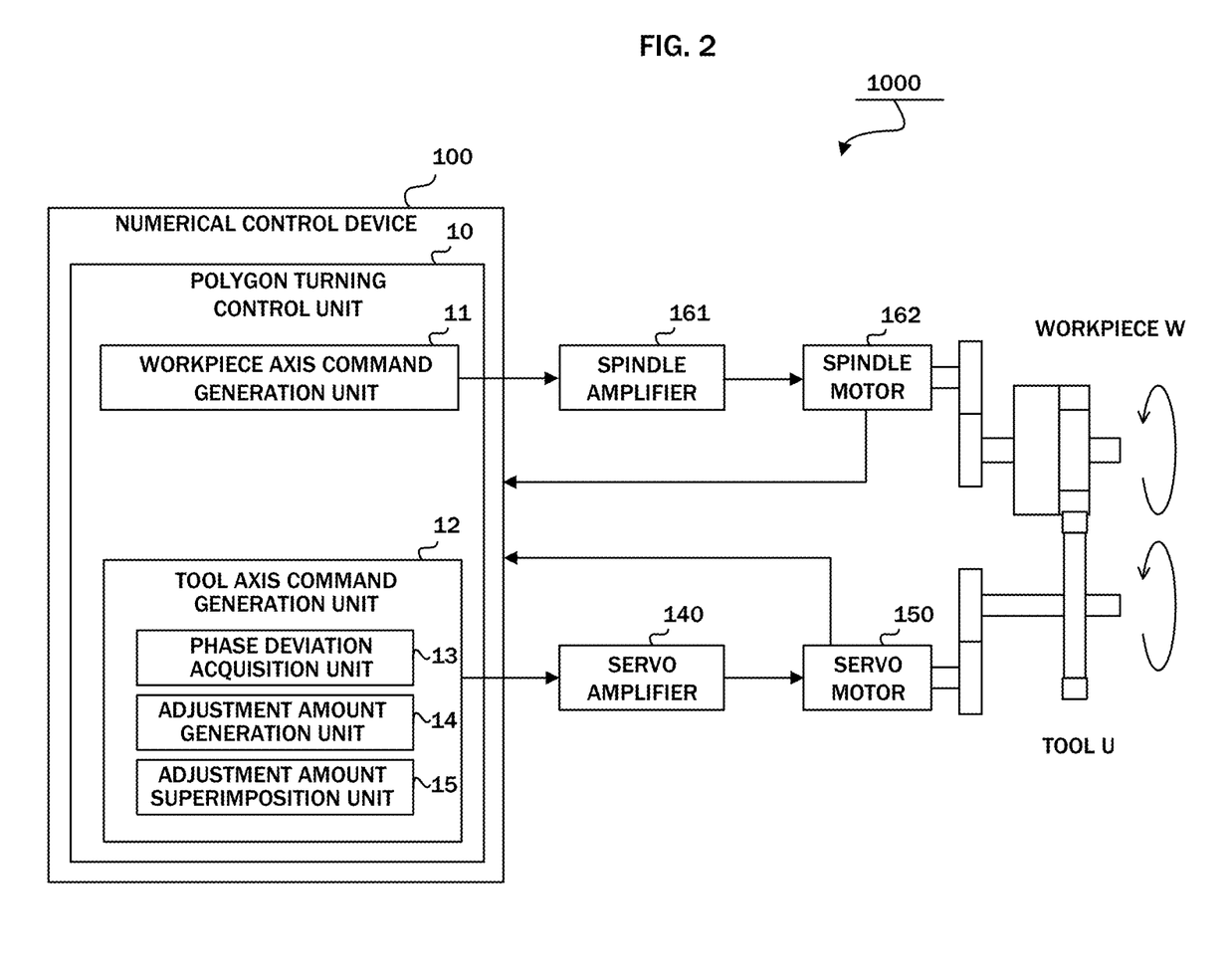
FIG. 2 is a block diagram of a control system in the present disclosure.

FIG. 2 is a block diagram of a control system 1000 in the first disclosure. The function in this block diagram is implemented when the CPU 111 of the numerical control device 100 executes a program stored in a storage device such as the ROM 112.

The numerical control device 100 includes a polygon turning control unit 10. The polygon turning control unit 10 includes a workpiece axis command generation unit 11 that generates a rotation command for the workpiece axis and a tool axis command generation unit 12 that generates a rotation command for the tool axis.

The workpiece axis command generation unit 11 generates a rotation command for the spindle 164. The workpiece axis command generation unit 11 generates a command to rotate the spindle 164 at a constant angular velocity ω and outputs the command to the spindle amplifier 161. The spindle amplifier 161 controls the spindle motor 162 in accordance with the command from the workpiece axis command generation unit 11. The spindle motor 162 rotates the spindle 164 at a constant angular velocity ω. Accordingly, the workpiece W attached to the spindle 164 rotates at the constant angular velocity ω.

The tool axis command generation unit 12 generates a rotation command for the tool U. The tool axis command generation unit 12 generates a command to rotate the tool U at a constant angular velocity and outputs the command to the servo amplifier 140. The servo amplifier 140 controls the servo motor 150 in accordance with the command from the tool axis command generation unit 12. The servo motor 150 rotates the tool U at a constant angular velocity in accordance with the control of the servo amplifier 140.

The tool axis command generation unit 12 includes a phase deviation acquisition unit 13, an adjustment amount generation unit 14, and an adjustment amount superimposition unit 15.

The phase deviation acquisition unit 13 according to the first disclosure acquires information on misalignment in the rotation direction of the cutting tool T. A deviation amount δ in the rotation direction of the cutting tool T is a difference between an actual angle and an ideal angle. The angle of the cutting tool T can be measured by a laser displacement meter, an angle meter, an image measuring instrument, or the like, and a measuring method is not particularly specified. A measurement result is input to the phase deviation acquisition unit 13.

The adjustment amount generation unit 14 calculates an adjustment amount $\gamma_i$ with respect to a deviation amount $\delta_i$ for each cutting tool $T_i$ and generates one or more pulses corresponding to the calculated adjustment amount $\gamma_i$.

The adjustment amount superimposition unit 15 superimposes the pulses generated by the adjustment amount generation unit 14 on a rotation command generated by the tool axis command generation unit 12 in synchronization with an idle running time of polygon turning. The idle running time of polygon turning means a period in which the cutting tool T of the tool U is not cutting the workpiece W and is rotating for nothing. During the idle running time, the adjustment amount superimposition unit 15 superimposes pulses, moves the phase of the tool axis by the adjustment amount $\gamma_i$ of a cutting tool which performs next cutting (assumed as $T_i$), and performs phase matching. Accordingly, the misalignment in the rotation direction of the cutting tool $T_i$ is corrected.

[Calculation Method for Adjustment Amount γ]

The following equations are equations for calculating the adjustment amount γ. In the present disclosure, it is possible to calculate the adjustment amount γ regardless of the number N of cutting tools T or the deviation amount δ of the cutting tools by using the following equations.

When the counterclockwise direction is defined as the positive direction (plus), the adjustment amount $\gamma_i$ with respect to the deviation amount $\delta_i$ for each cutting tool $T_i$ is expressed by the following equation:

$$\gamma_i = \delta_{i-1} - \delta_i,$$

where $\gamma_1 = \delta_N - \delta_1$ (N denotes the number of cutting tools T) and the adjustment amount $\gamma_i$ in the first cutting is $-\delta_i$ in the above equation.

In calculating the adjustment amount $\gamma_i$ in such a way, when the phase of the tool axis is adjusted by $-\delta_i$ in the first cutting, the deviation amount $+\delta_i$ of the cutting tool $T_i$ is cancelled into zero. At the end of cutting by the cutting tool $T_i$, since the phase of the tool axis is deviated by $-\delta_i$, if the phase of the tool axis is adjusted by $\delta_i - \delta_{i+1}$, the phase deviation of the tool axis is $-\delta_{i+1}$, and the deviation amount $+\delta_{i+1}$ of the cutting tool $T_{i+1}$ is cancelled into zero. At the end of cutting by the cutting tool $T_{i+1}$, since the phase of the tool axis is deviated by $-\delta_{i+1}$, if the phase of the tool axis is adjusted by $\delta_{i+1} - \delta_{i+2}$, the phase deviation of the tool axis is $-\delta_{i+2}$, and the deviation amount $+\delta_{i+2}$ of the cutting tool $T_{i+2}$ is cancelled into zero. While the cutting tool $T_i$ is being rotated, the adjustment amount $\gamma_i$ periodically changes in accordance with the deviation amount $\delta_i$ of the cutting tool $T_i$.

As a specific example, a method for calculating adjustment amounts $\gamma_1, \gamma_2, \gamma_3$ of the deviation amounts $\delta_1, \delta_2, \delta_3$ of three cutting tools $T_1, T_2, T_3$ will be described with reference to FIG. 3. When the number of cutting tools T is three, the adjustment amounts $(\gamma_1, \gamma_2, \gamma_3)$ of each cutting tool $T_i$ will be $(\gamma_1, \gamma_2, \gamma_3 = (\delta_3 - \delta_1, \delta_1 - \delta_2, \delta_2 - \delta_3 | -\delta_i$ for only the first cutting) according to the above equation.

Figure 3:
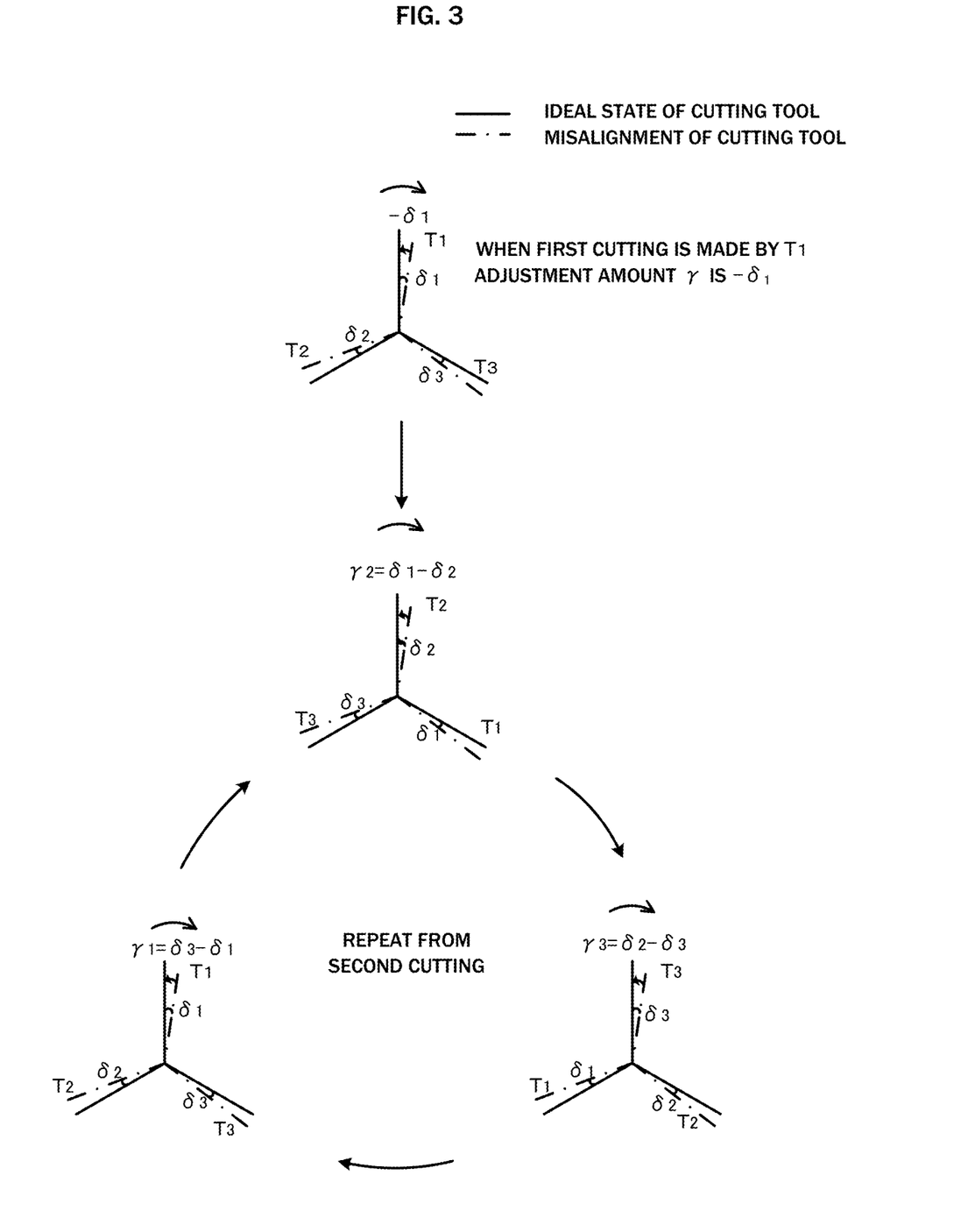
FIG. 3 is a diagram illustrating an example of calculating adjustment amounts of three cutting tools.

In the example of FIG. 3, cutting is performed by the cutting tool $T_1$ in the first cutting. In such a case, the adjustment amount in the first cutting is $-\delta_1$. Thus, the phase of the tool axis is deviated by $-\delta_1$. After the first cutting, the adjustment amount $\gamma_i$ can be calculated in accordance with the cutting tool $T_i$ used for cutting. As illustrated in FIG. 3, the adjustment amount $\gamma_i$ periodically changes as with $(\gamma_1, \gamma_2, \gamma_3) = (\delta_3 - \delta_1, \delta_1 - \delta_2, \delta_2 - \delta_3)$ in accordance with the cutting tool $T_i$ used for cutting.

Figure 4A:
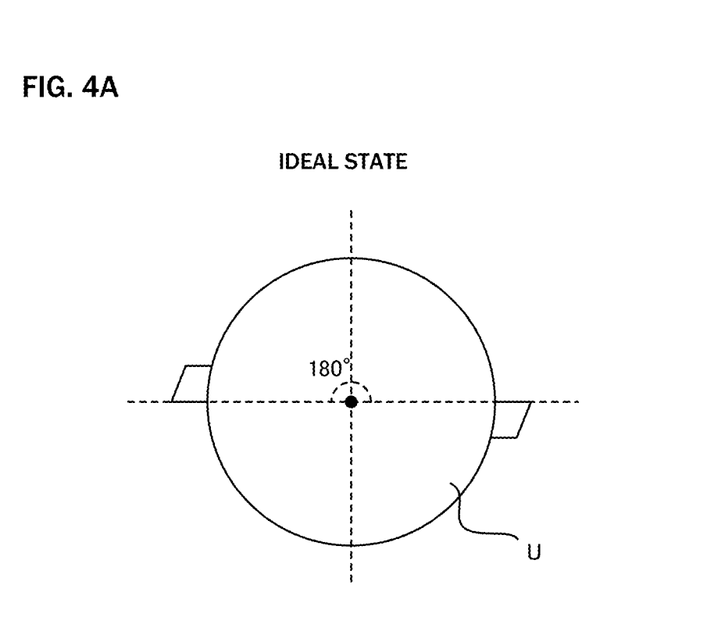
FIG. 4A is a diagram illustrating an example of a tool where misalignment in a rotation direction does not occur (an ideal state).
Figure 4B:
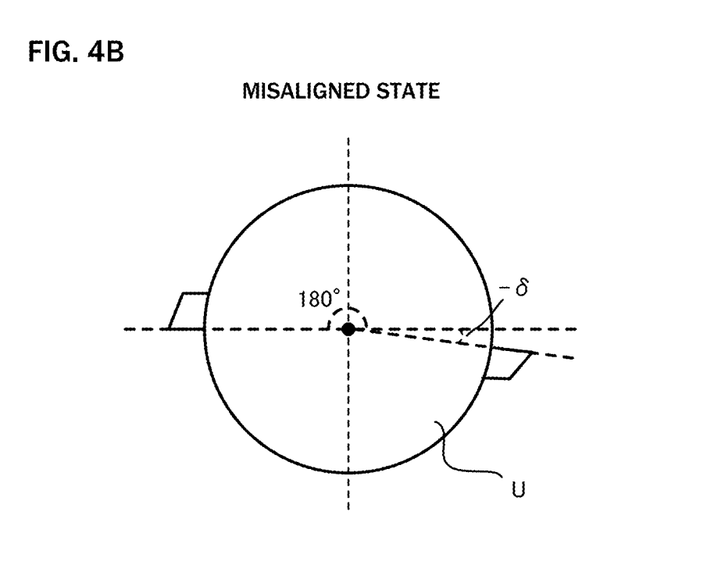
FIG. 4B is a diagram illustrating an example of a tool where misalignment in the rotation direction occurs (a misaligned state).
Figure 5:
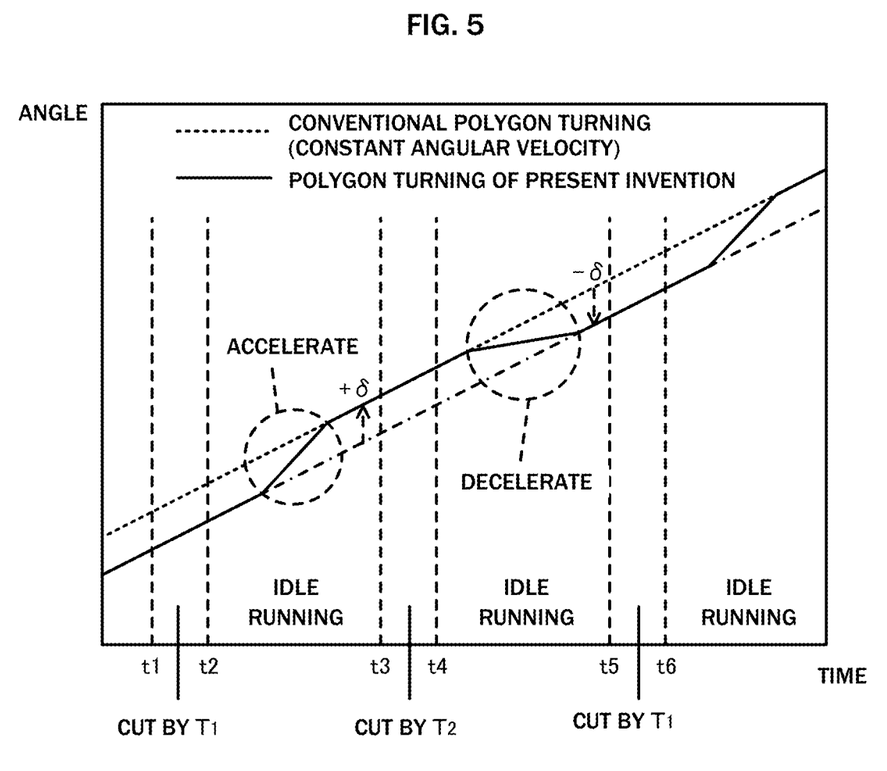
FIG. 5 is a diagram illustrating a change in the angle of a tool axis when misalignment in the rotation direction is corrected.
Figure 6A:
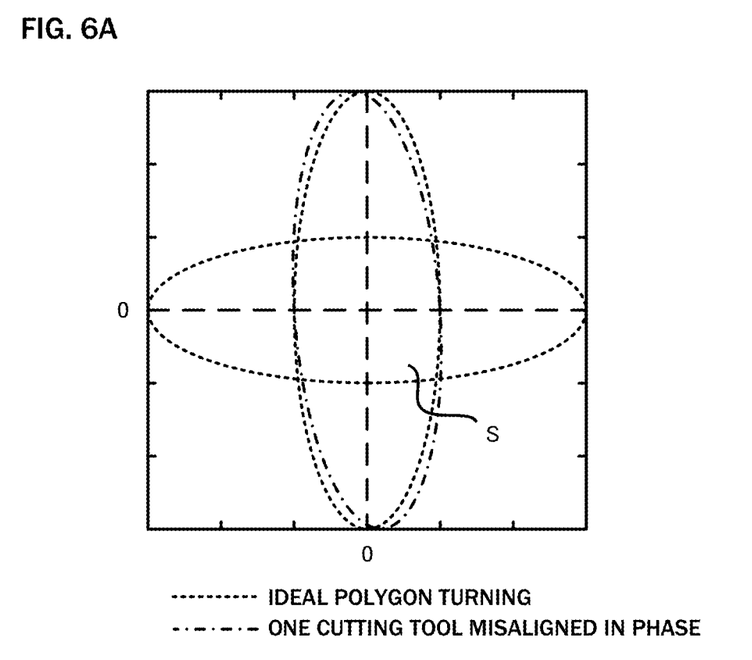
FIG. 6A is a diagram illustrating a change in orbits of the cutting tools according to the present disclosure.
Figure 6B:
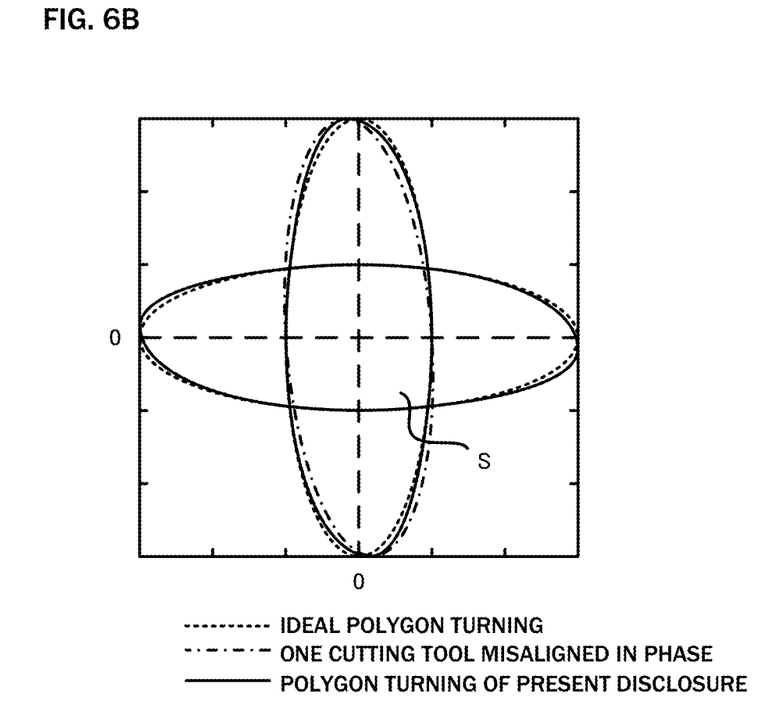
FIG. 6B is a diagram illustrating a change in orbits of the cutting tools according to the present disclosure.

FIG. 4A and FIG. 4B illustrate the tool U where misalignment occurs, FIG. 5 illustrates a change in the angle of the tool axis when the misalignment is corrected, and FIG. 6A and FIG. 6B illustrate a change in the processed surface after the misalignment has been corrected.

Two cutting tools $T_1$ and $T_2$ are attached at the same interval to the tool U of FIG. 4A and FIG. 4B. When the two cutting tools $T_1$ and $T_2$ are attached, although the angle between one cutting tool $T_1$ and the other cutting tool $T_2$ is ideally 180 degrees as illustrated in FIG. 4A, misalignment in the rotation direction may occur as illustrated in FIG. 4B for some reason. In FIG. 4B, the cutting tool $T_2$ on the right is misaligned by $-\delta$ (deviation amount $\delta_2$) based on the cutting tool $T_1$ on the left (deviation amount $\delta_1 = 0$) as a reference. With the deviation amount $(\delta_1, \delta_2) = (0, -\delta)$, the adjustment amount $(\gamma_1, \gamma_2) = (\delta_2 - \delta_1, \delta_1 - \delta_2) = (-\delta, +\delta$; where the adjustment amount for the first cutting is $-\delta_i$) can be calculated in accordance with the above equation.

FIG. 5 illustrates a relationship between the angle of a tool axis and time when the misalignment of FIG. 4B is corrected. The dotted line indicates the conventional polygon turning, and the solid line indicates the polygon turning of the present disclosure. In the conventional polygon turning, the angular velocity of the tool axis is constant.

In the polygon turning of the present disclosure, when cutting is started with the cutting tool $T_1$, the adjustment amount $\gamma_1$ in the first cutting is zero (time t1 to t2), and the workpiece W is thus cut in a state where the phase deviation is zero. Next, when cutting is performed with the cutting tool $T_2$, the angular velocity is increased to shift the phase by $+\delta$ in the idle running time (time t2 to t3) before start of cutting. In the second cutting (time t3 to t4), the workpiece W is cut in a state where the phase is deviated by $+\delta$. When the cutting is performed again with the cutting tool $T_1$ after one turn of the tool U, the angular velocity is reduced to change the phase deviation back to zero in the idle running time before start of cutting (time t4 to t5). In the third cutting (time t5 to t6), the workpiece W is cut in a state where the phase deviation is zero. The numerical control device 100 then repeats the process of time t2 to t6.

When the phase is controlled as illustrated in FIG. 5, the orbits of the cutting tools T change as illustrated in FIG. 6A and FIG. 6B. When the workpiece W is cut by the two cutting tools $T_1$ and $T_2$, if the cutting tools $T_1$ and $T_2$ are attached at ideal positions, the quadrangle S formed by the polygon turning becomes substantially a square, as indicated by the dotted lines in FIG. 6A. If the cutting tool $T_2$, which is one of the two cutting tools $T_1$ and $T_2$, is inclined, the orbit of the inclined cutting tool $T_2$ is inclined, and the cut surface formed by the cutting tool $T_2$ is also inclined to form a rhombus-like shape, as indicated by the dot-dash line in FIG. 6A.

The solid lines in FIG. 6B indicate the orbits of the two cutting tools $T_1$ and $T_2$ in the polygon turning of the present disclosure. In the polygon turning of the present disclosure, misalignment in the rotation direction is corrected in an idle running time when the cutting tools $T_1$ and $T_2$ are not in cutting. As a result, the orbits of the cutting tools $T_1$ and $T_2$ during cutting match the ideal orbits. Accordingly, the misalignment in the rotation direction of the cutting tool T is corrected, and the quadrangle S formed by the polygon turning will be substantially a square.

[Second Disclosure]
[Measuring Method 1 for Deviation Amount δ]

In the second disclosure, a workpiece W obtained as a result of test processing is used to calculate the deviation amount δ in the rotation direction. As illustrated in FIG. 6A, the processed surface of the workpiece W is misaligned by the degree of misalignment of the cutting tool T. It is thus possible to calculate the deviation amount δ in the rotation direction of the cutting tool T by using an angle θ of the processed surface of the workpiece W obtained as a result of test processing.

Measurement of the workpiece W is performed by an operator, for example. The measuring instrument may be a laser displacement meter, an angle meter, an image measuring instrument, or the like but is not limited thereto. After measuring the angle of the workpiece W, the operator inputs the angle of the workpiece W to the numerical control device 100 via the input unit 30. Calculation of the deviation amount δ is performed by the phase deviation acquisition unit 13.

The following equations are equations for calculating the deviation amount δ. In the present disclosure, the deviation amount δ can be calculated from the angle θ of the workpiece W on which test processing has been performed, regardless of the number N of cutting tools, by using the following equations. The method for calculating the deviation amount δ using the angle θ of the workpiece W will be described.

In this example, the tool U having N edges is used, and rotation of the workpiece axis and the tool axis at a rotation ratio of 1:2 is applied. If polygon turning is performed under such a condition, the external shape of the workpiece will be a regular 2N-sided polygon. Although each side becomes a shallow curved side and the external shape of the workpiece does not become a complete regular 2N-sided polygon in a strict sense because the polygon turning is to process the workpiece surface with a combination of ellipses, the external shape is here considered as a regular 2N-sided polygon. When the processed surface is considered as a regular 2N-sided polygon, opposing two sides of the regular 2N-sided polygon are parallel to the longer axis of an ellipse drawn by each cutting tool T. The cutting tool number is denoted as n (=1, . . . , N), and a cut side formed by the cutting tool $T_n$ of the cutting tool number n is denoted as $S_n$. Since two opposing sides are formed by the same cutting tool $T_n$ and the cross section viewed from the workpiece axis direction is line symmetrical, only one of the sides will be described.

The angle formed between adjacent two sides $S_n$ and $S_{n+1}$ of a regular N-sided polygon is denoted as $\theta_n$. The angle $\theta_N$ for n=N is the angle formed between the sides $S_N$ and $S_1$. If there is no misalignment in the cutting tool T, all the angles will be (180–180/N) degrees (=θ). For simplified illustration, the deviation amount in the rotation direction in each cutting tool $T_n$ is defined as $\delta_n$, based on the cutting tool $T_1$ for n=1 as a reference. Since the cutting tool for n=1 is defined as the reference, $\delta_1=0$ is established. A deviation amount $\delta_n$ of the cutting tool $T_n$ causes the processed side $S_n$ formed by the cutting tool $T_n$ to be also inclined by an angle $\delta_n$, and $\theta_n=\theta+\delta_n-\delta_{n+1}$ is thus established for n (=1, . . . , N−1). For n=N, $\theta_n=\theta+\delta_N-\delta_1$ is established. Since θ and $\delta_1$ are known, it is possible to calculate the deviation amount $\delta_N$ of the cutting tool $T_N$ by measuring the angle $\theta_N$ formed between the side $S_1$ formed by the cutting tool $T_1$, which is the reference, and the side $S_N$ formed by the cutting tool $T_N$. Similarly, it is possible to calculate the deviation amount $\delta_n$ for each cutting tool $T_n$ from the above equation by measuring the angle $\theta_n$ of the regular N-sided polygon.

Figure 7A:
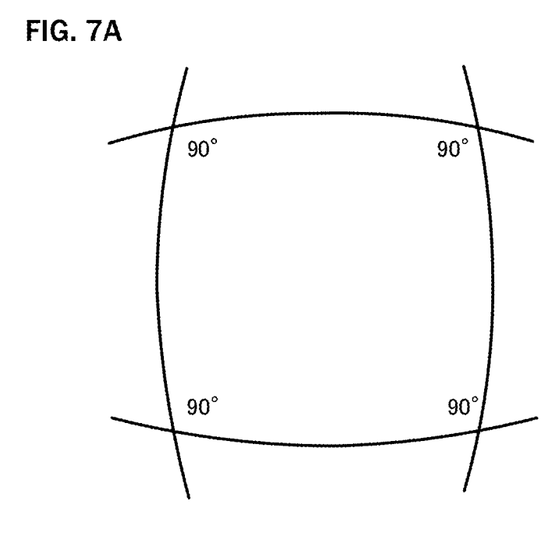
FIG. 7A is a diagram illustrating a change in the shape of a processed article caused by misalignment of the cutting tool.
Figure 7B:
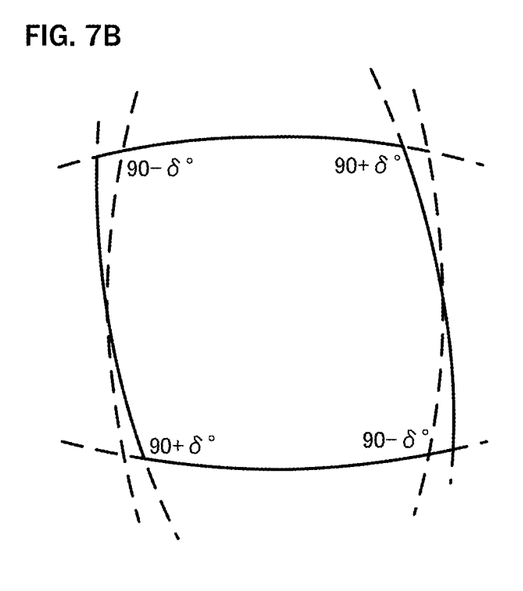
FIG. 7B is a diagram illustrating a change in the shape of a processed article caused by misalignment of the cutting tool.

As specific examples, a case where the number of cutting tools is two and a case where the number of cutting tools is three will be described. When the tool U to which the two cutting tools $T_1$ and $T_2$ are attached is rotated at a rotation ratio 1:2 of the workpiece axis to the tool axis as illustrated in FIG. 4A and FIG. 4B, the external shape of the workpiece W will be a square. When the cutting tools $T_1$ and $T_2$ are attached at the ideal positions as illustrated in FIG. 4A, each of the four angles of the square is 90 degrees as illustrated in FIG. 7A. If the cutting tool $T_2$ is misaligned by $\delta_2$ in the rotation direction as illustrated in FIG. 4B, however, the side $S_2$ formed by the misaligned cutting tool $T_2$ is also inclined by the angle $\delta_2$, and this will result in a rhombus whose respective angles of opposing corners are $\theta_1=90-\delta$ degrees and $\theta_2=90+\delta$ degrees as illustrated in FIG. 7B. Thus, by substituting respective angles $\theta_1$ and $\theta_2$ of the workpiece W obtained as a result of test processing into the above equation, it is possible to calculate the deviation amount $\delta_2$ of the cutting tool $T_2$ and also calculate adjustment amounts $\gamma_1$ and $\gamma_2$.

Figure 8:
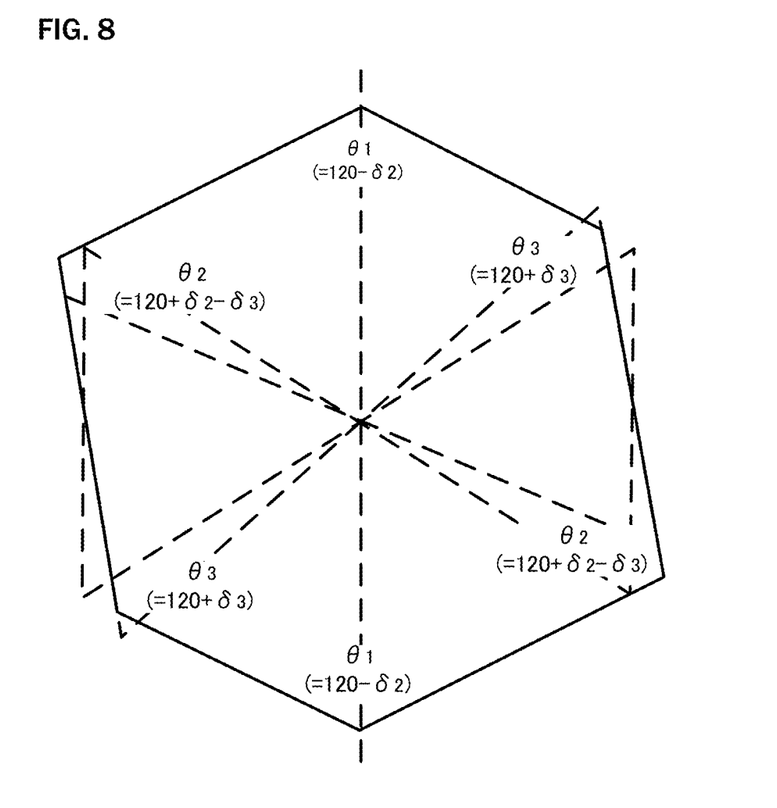
FIG. 8 is a diagram illustrating a change in the shape of a processed article caused by misalignment of the cutting tool.

Also when the number of cutting tools is three, the deviation amount δ can be calculated from respective angles of the workpiece W. If the cutting tools $T_2$, $T_3$ are misaligned by $\delta_2$, $\delta_3$ in the rotation direction, the sides $S_2$, $S_3$ formed by respective cutting tools $T_2$, $T_3$ are also inclined by angles $\delta_2$, $\delta_3$, and as illustrated in FIG. 8, $\theta_1=120-\delta_2$ degrees, $\theta_2=120+\delta_2-\delta_3$ degrees, and $\theta_3=120+\delta_3$ degrees are established. Thus, the deviation amounts $\delta_2$, $\delta_3$ of the cutting tools $T_2$, $T_3$ can be calculated from respective angles $\theta_1$, $\theta_2$, and $\theta_3$ of the workpiece W obtained as a result of test processing, and adjustment amounts $\gamma_2$, $\gamma_3$ are also found. Also when the number of cutting tools is four or greater, the calculation is possible in the same manner.

As discussed above, in the second disclosure, the angle θ of a polygon obtained as a result of test processing is acquired as information on misalignment in the rotation direction of a cutting tool, and the deviation amount δ for each cutting tool is calculated.

In the numerical control device 100 of the second disclosure, the deviation amount δ in the rotation direction of the cutting tool T can be determined from the angle θ of the workpiece W obtained as a result of test processing.

Note that, although the disclosure is configured such that the operator measures the angle of the workpiece W and the numerical control device 100 calculates the deviation amount δ in the above description, the disclosure may be configured such that the operator calculates a deviation amount and inputs the deviation amount to the numerical control device 100.

[Third Disclosure]
[Adjustment Method 2 for Deviation Amount δ]

In the third disclosure, the phase deviation acquisition unit 13 adjusts the deviation amount δ by using load torque.

Figure 9:
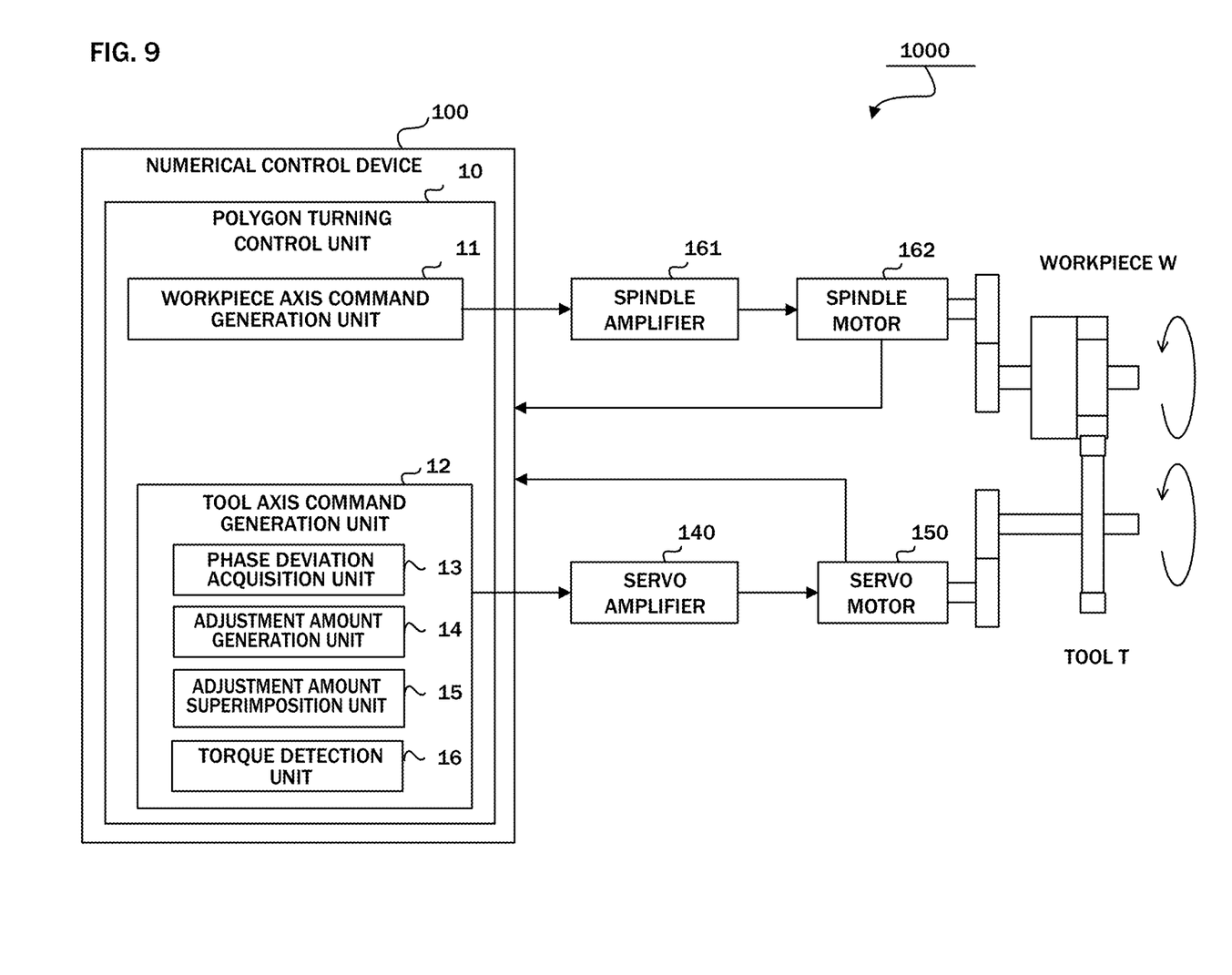
FIG. 9 is a block diagram of a numerical control device in a third disclosure.

FIG. 9 is a block diagram of the control system 1000 of the third disclosure. The numerical control device 100 of the third disclosure has the phase deviation acquisition unit 13 that acquires information on misalignment in the rotation direction, the adjustment amount generation unit 14 that generates pulses to correct the deviation amount δ based on a value of load torque, the adjustment amount superimposition unit 15 that superimposes the pulses in synchronization with an idle running time of the tool U, and a torque detection unit 16 that determines load torque.

The torque detection unit 16 determines a load applied to the tool axis and outputs a determined result on the load torque to the phase deviation acquisition unit 13.

Figure 10:
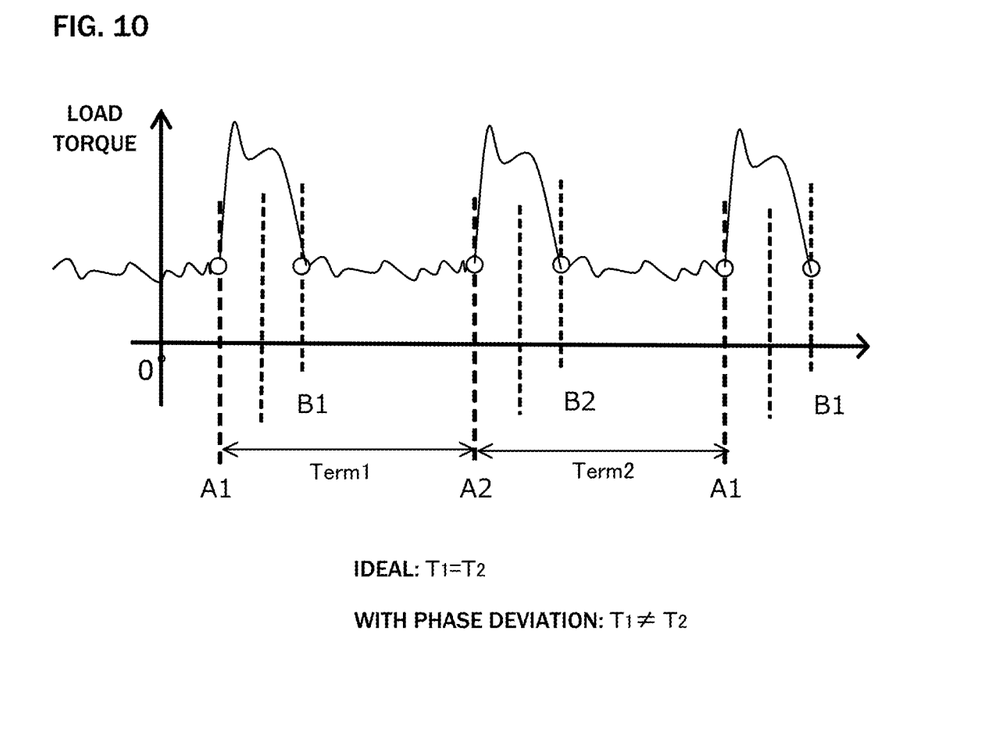
FIG. 10 is a diagram illustrating a relationship between a change in load torque and an adjustment time for a deviation amount.

The adjustment amount generation unit 14 determines a phase deviation amount in the rotation direction between the cutting tool $T_1$ and the cutting tool $T_2$ based on a change in the load torque acquired by the phase deviation acquisition unit 13 and generates pulses to correct the misalignment. FIG. 10 represents a change in the load torque when the workpiece W is cut by the cutting tool $T_2$ after the workpiece W is cut by the cutting tool $T_1$. The load applied to the tool axis rises at a point of time A1 when the cutting tool $T_1$ comes into contact with the workpiece W, continues in the high load state during the cutting tool $T_1$ cutting the workpiece W, and falls at the point of time B1 when the cutting tool $T_1$ leaves the workpiece W. Then, the load rises at a point of time A2 when the next cutting tool $T_2$ comes into contact with the workpiece W, continues in the high load state during the cutting tool $T_2$ cutting the workpiece W, and falls at the point of time B2 when the cutting tool $T_2$ leaves the workpiece W.

When the regular polygon is formed, since sides of the same length are sequentially formed, all the periods from a rise to the next rise of the load torque can be the same. In the example of FIG. 10, a period Term 1 from start of cutting by the cutting tool $T_1$ to start of cutting by the cutting tool $T_2$ and a period Term 2 from start of cutting by the cutting tool $T_2$ to start of cutting by the next cutting tool $T_1$ are ideally in a relationship of Term 1=Term 2.

In other words, in a case of Term 1≠Term 2, this means that phase deviation has occurred. Thus, the difference between Term 1 and Term 2 is found, which is used as a deviation amount of the phase, and pulses to correct this time difference are generated.

The adjustment amount superimposition unit 15 superimposes the pulses generated by the adjustment amount generation unit 14 on a rotation command generated by the tool axis command generation unit 12 in synchronization with an idle running time of polygon turning. The idle running time of the polygon turning can be detected from the torque load. In the example of FIG. 10, pulses to correct a time difference between Term 1 and Term 2 are superimposed during a period from the point of time B1 when the torque load falls to the point of time A2 when the next torque rises.

As discussed above, in the numerical control device 100 of the second disclosure, load torque is used to detect and correct misalignment of a cutting tool. In this method, the misalignment can be automatically corrected in a state where the tool U and the workpiece W are attached to a machine tool. Further, when the regular polygon is formed, the period from a rise of the load to the next rise of the load can be made constant.

Note that, although a period from a rise to the next rise of the load is used as the reference for correction in the present disclosure, falls of the load may be used as the reference for correction, or another timing may be used as the reference for correction.

As described above, the numerical control device 100 of the present first to third disclosure generates pulses in accordance with the deviation amount δ in the rotation direction of the cutting tool T, superimposes the pulses on a rotation command for the tool axis, and thereby can correct misalignment of the cutting tool T without adjusting the attachment position of the cutting tool T.

In the numerical control device 100 of the second disclosure, an angle of the workpiece W obtained as a result of test processing is used to calculate the deviation amount δ. Since the angle of the workpiece W can be measured by an instrument such as an angle meter, no special measuring instrument is required. Furthermore, it is possible to adjust misalignment without detaching the tool U from a machine tool.

In the numerical control device 100 of the third disclosure, since load torque is used to adjust a deviation amount, misalignment can be corrected in a state where the workpiece W or the tool U are attached to a machine tool. Note that, although the adjustment is performed to have a constant period because the shape of the processed surface is a regular polygon in the third disclosure, when the shape of the processed surface is a shape other than a regular polygon, the adjustment period may be changed in accordance with the shape of the processed surface.

Although one embodiment has been described above, the present invention is not limited to only the disclosure described above and can be implemented in various forms with addition of a suitable change.

For example, although the phase of the tool axis is adjusted to correct a deviation amount of the cutting tool T in the embodiment described above, the phase of the workpiece axis may be adjusted to correct a deviation amount of the cutting tool T.

Although the misalignment of the cutting tool T has been described as being caused by an attachment error in the above description, the numerical control device 100 of the present disclosure can also correct misalignment caused by a reason other than an attachment error, such as wear of an edge or wear of a bearing, for example.

The procedure of calculating the adjustment amount γ from the deviation amount δ performed by the adjustment amount generation unit 14 is not limited to those described above. If a reference cutting tool T is selected so that the adjustment amount γ becomes smaller or if an ideal position of each cutting tool T is calculated, this enables quick phase matching of the cutting tool T and thus is efficient.

Further, correction of misalignment in the rotation direction and correction in the radial direction of the cutting tool T may be combined.

Typically, misalignment of the cutting tool T occurs not only in the rotation direction but also in the radial direction.

It is thus desirable to use the misalignment in both the directions in combination to perform correction.

In the correction of misalignment in the radial direction, first, misalignment in the radial direction is measured. The misalignment in the radial direction can be calculated from the distance between two opposing sides of the workpiece W obtained as a result of test processing. In addition, a laser displacement meter, an angle meter, an image measuring instrument, or the like can be used to directly measure the tool U to determine the deviation amount $\delta$.

It is possible to correct the deviation amount $\sigma$ in the radial direction by adjusting the inter-axis distance between the workpiece axis and the tool axis.

That is, when the cutting tool T is misaligned to outside of the reference position, the inter-axis distance between the workpiece axis and the tool axis is reduced to adjust the deviation amount to zero. Further, when the cutting tool T is misaligned to inside of the reference position, the inter-axis distance between the workpiece axis and the tool axis is increased to adjust the deviation amount to zero.

The deviation amount $\delta$ in the rotation direction differs for each cutting tool T. Thus, when the deviation amount in the rotation direction of the cutting tool $T_i$ is defined as $\delta_i$, the deviation amount $\delta_i$ in the rotation direction and the deviation amount $\sigma_i$ in the radial direction are corrected simultaneously in an idle running time before cutting is performed by the cutting tool $T_i$.

As described above, when correction of the rotation direction and correction of the radial direction are performed simultaneously, the precision of polygon turning can be improved without requiring replacement of the cutting tool T.

The invention claimed is:

1. A control device configured to control polygon turning to simultaneously rotate a workpiece and a tool and form a polygon on a surface of the workpiece, the control device comprising:
   a processor configured to
      generate a command for an angular velocity of the workpiece,
      generate a command for an angular velocity of the tool,
      acquire information on misalignment in a rotation direction of a cutting tool attached to the tool,
      generate, based on the information on the misalignment in the rotation direction of the cutting tool, a pulse to adjust any one or both of a phase of a tool axis and a phase of a workpiece axis, and
      superimpose, in idle running of the tool in the polygon turning, the pulse on any one or both of the command for the angular velocity of the workpiece and the command for the angular velocity of the tool to control the tool axis or the workpiece axis to move according to the pulse.

2. The control device according to claim 1, wherein the information on the misalignment in the rotation direction of the cutting tool is an angle of a workpiece external shape when test processing is performed.

3. The control device according to claim 1, wherein the information on the misalignment in the rotation direction of the cutting tool is a load applied to the tool when the workpiece is cut.

4. A control system configured to control polygon turning to simultaneously rotate a workpiece and a tool and form a polygon on a surface of the workpiece, the control system comprising:
   a processor configured to
      generate a command for an angular velocity of the workpiece,
      generate a command for an angular velocity of the tool,
      acquire information on misalignment in a rotation direction of a cutting tool attached to the tool,
      generate, based on the information on the misalignment in the rotation direction of the cutting tool, a pulse to adjust any one or both of a phase of a tool axis and a phase of a workpiece axis, and
      superimpose, in idle running of the tool in the polygon turning, the pulse on any one or both of the command for the angular velocity of the workpiece and the command for the angular velocity of the tool to control the tool axis or the workpiece axis to move according to the pulse.

* * * * *